United States Patent [19]
Chitayat

[11] Patent Number: 4,733,143
[45] Date of Patent: Mar. 22, 1988

[54] LINEAR MOTOR

[75] Inventor: Anwar Chitayat, North Port, N.Y.

[73] Assignee: Anorad Corporation, Hauppauge, N.Y.

[21] Appl. No.: 650,435

[22] Filed: Jan. 7, 1985

Related U.S. Application Data

[62] Division of Ser. No. 383,351, Jun. 1, 1982, Pat. No. 4,560,911.

[51] Int. Cl.$^4$ .............................................. H02K 41/00
[52] U.S. Cl. ..................................... 318/135; 310/12; 310/13
[58] Field of Search ................................... 310/12–14, 310/268; 318/135

[56] References Cited

U.S. PATENT DOCUMENTS

| | | | |
|---|---|---|---|
| 3,136,934 | 6/1964 | Henry-Baudot | 310/268 X |
| 4,151,447 | 4/1979 | von der Heide | 318/135 |
| 4,187,453 | 2/1980 | Rough | 318/135 |
| 4,247,793 | 1/1981 | Rough | 310/12 |
| 4,369,383 | 1/1983 | Langley | 310/12 |
| 4,439,698 | 3/1984 | Chen | 310/14 X |
| 4,560,911 | 12/1985 | Chitayat | 310/12 X |

OTHER PUBLICATIONS

"The Linear D.C. Motor Improves Control Flexibility" by J. J. Brough published in *Electrical Review* Nov. 8, 1974.
"Position Control of Linear D.C. Motors" by J. J. Brough published in *Electrical Review* vol. 199, No. 11, Sep. 17, 1976.
"D.C. Linear Motors for Elevator Door Operators" by P. L. Jones published in *Elevator World* May 1970.
"D.C. Linear Motors for Industrial Applications" by P. L. Jones published in *Electrical Times* Jul. 10, 1969.
"An Introduction to the Linear D.C. Motor" by J. J. Brough published in *Electronics & Power* Sep. 5, 1974.

*Primary Examiner*—Donovan F. Duggan
*Attorney, Agent, or Firm*—Thomas R. Morrison

[57] ABSTRACT

A linear DC motor adapted for driving a positioning table having a frame and a table displaceable in a linear direction has a toothed assembly affixed to one element thereof and an array of permanent magnets facing the toothed assembly mounted on the other element. Coils wound around the teeth of the toothed assembly and appropriately energized by DC produce a linear force which is effective to displace the table in a desired direction. When used with a position sensor and an appropriate control system, the table is controllable to a desired position. A set of brush members depending from the table contact a developed linear slip ring track for energizing the coils and for switching polarity of voltage to the coils at appropriate locations. In an embodiment where the coils are stationary on the frame and the magnets are disposed on the table, a power pickup arrangement movable with the brush members is incorporated into the brush and developed slip ring apparatus.

3 Claims, 10 Drawing Figures

LINEAR MOTOR

This is a division of application Ser. No 383,351, filed June 1, 1982, now U.S. Pat. No. 4,560,911, issued Dec. 24, 1985.

BACKGROUND OF THE INVENTION

The present invention relates to linear motors and, more particularly, to DC linear motors for controlling the position of an object along an axis.

Applications in which a DC linear motor may be employed include the driving of a positioning table along an axis.

Positioning tables are commonly used for moving a work object such as, for example, an electronic device in a precise path for performing an operation or inspection on the work object. Desirable characteristics of such positioning tables include precision, compactness, the maximum speed at which the table can be driven and the accuracy with which the table may be positioned.

Conventionally, positioning tables have been driven by a motor affixed at one end of a frame rotating a lead screw which extends in the direction of motion of the table and is supported at its outboard end by a precision bearing. A recirculating ball nut affixed to the table engages the lead screw whereby rotation of the lead screw urges the recirculating ball nut and the attached table to move with respect to the frame.

Certain problems are inherent in lead screw drive. Precision lead screws and recirculating ball nuts are expensive and, with the rotor of the drive motor, such components present a substantial inertia resisting the desired rapid accelerations and decelerations necessary to achieve agility in positioning, the table. Furthermore, a certain amount of windup in the screw and ball nut arrangement is unavoidable. In addition to the above, great precision is required to aligning the lead screw with the direction of displacement of the table. If proper alignment is not achieved, positioning accuracy is seriously affected. Since the maximum linear speed of the table is limited by the speed at which the lead screw can be rotated, it is difficult to achieve high linear speed combined with accurate positioning.

Typically, screw driven tables of the prior art have included drive motors mounted at one end of the frame and extending outward from the frame. Thus, a greater space must be provided for the larger planform of the assembly including the additional length of the extending motor.

U.S. Pat. No. 4,151,447 discloses a linear DC motor having rows of pairs of vertically standing permanent magnets between which flat coils are arranged to travel. The polarity of DC power to the flat coils is switched by a magnetic field or electrooptical sensor at predetermined points in the travel of the flat coils. The apparatus in this patent employs trailing cables for feeding power to the coils.

OBJECTS AND SUMMARY OF THE INVENTION

Accordingly, it is an object of the present invention to provide a linear DC motor which overcomes the drawbacks of the prior art.

It is a further object of the invention to provide a linear DC motor suitable for driving a positioning table.

It is a further object of the invention to provide a linear DC motor usable in a positioning table in which a linear toothed structure includes coils wound around the individual teeth to form a repeating line pattern of electrically produced magnetic poles facing a corresponding parallel array of magnets arranged with alternating magnetic polarity having their broad faces closest to the toothed assembly.

It is a further object of the invention to provide a linear DC motor employing a brush assembly on the movable element thereof contacting a linear slip ring assembly on the stationary element thereof for switching the polarity of voltage applied to energizing coils of the motor.

It is a further object of the invention to provide a linear DC motor employing linear power pickup rails in conjunction with brushes and linear slip rings for feeding and controlling power to energizing coils.

It is a further object of the invention to provide a brush and power pickup brush assembly for feeding first and second electrical polarities to energizing coils which employs two identical comb-like structures for both picking up power from linear power pickup rails and for feeding power to the coils through a linear slip ring.

According to an aspect of the present invention, there is provided a linear DC motor comprising a frame, a table on the frame linearly movable along an axis with respect to the frame, at least one coil having a core therein affixed to one of the frame and the table the coil being effective when energized to produce a first magnetic pole in the core, the first magnetic pole facing the other of the frame and the table, at least one permanent magnet having a second magnetic pole, the permanent magnet being affixed to the other of the frame and the table with the second magnetic pole facing the first mentioned of the frame and the table, a linear slip ring assembly affixed to the frame, the linear slip ring assembly defining a plane and having a plurality of metallic areas electrically separated from each other and forming a line substantially parallel to the axis, a brush assembly affixed to the table and having spaced apart contact members slidably contacting the metallic areas at contact points, and means for feeding electrical power through the contact points to the at least one coil in a sense which is effective to magnetize the core with the first magnetic pole having a magnetic polarity which interacts with the second magnetic pole of the at least one permanent magnet to tend to urge the table in a desired direction along the axis.

According to a feature of the present invention, there is provided a linear DC motor comprising a frame, a table on the frame linearly movable along an axis with respect to the frame, a substantially planar toothed assembly of magnetizable material affixed to the frame facing the table, the toothed assembly having parallel rows of spaced apart slots in a surface thereof facing the table, the slots extending in a direction normal to the axis and defining parallel rows of teeth, a plurality of coils in the slots each wound around one of the teeth and being effective when energized to produce a magnetic pole in its tooth facing the table, a plurality of parallel bar shaped permanent magnets affixed to the table in a direction substantially normal to the axis and having surfaces defining a plane facing the toothed assembly, each of the permanent magnets having a magnetic pole normal to the plane and adjacent ones of the permenent magnets having opposite magnetic poles facing the toothed assembly, a linear slip ring assembly defining a plane including a plurality of metallic areas forming a line substantially parallel to the axis, the metallic areas being connected to the coils, first and second power pickup rails in the plane extending parallel to the line, at least a first power pickup brush member slidably contacting the first power pickup rail at substantially all positions of the table, a first plurality of spaced apart brush members electrically connected to the first power pickup brush member and slidably contacting individual ones of the metallic areas, at least a second power pickup brush member slidably contacting the second power pickup rail at substantially all positions of the table, a second plurality of brush members spaced apart from each other and from the first plurality of brush members, the second plurality of brush members being electrically connected to the second power pickup brush member and slidably contacting other individual ones of the metallic areas, the first and second pluralities of brush members being effective to energize at least two adjacent ones of the coils producing opposite magnetic polarities in teeth about which they are wound whereby interaction of magnetic fields of the teeth and the permanent magnets are effective to urge the table along the axis.

According to a further feature of the present invention, there is provided a linear motor for a table, the table being constrained for travel in a single linear dimension with respect to a frame, comprising means attached to the table for holding at least first and second brushes, stationary means coacting with the at least first and second brushes for feeding electric power to the at least first and second brushes, at least one coil energized by electric power fed to the at least first and second brushes, the at least one coil being mounted on one of the table and the frame and facing the other thereof, at least one permanent magnet on the other of the table and the frame and having a magnetic pole facing the at least one coil, and the at least one coil being effective when energized to produce at least a second magnetic pole facing and coacting with the at least one permanent magnet whereby the table is urged in a selected direction along the single linear dimension.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
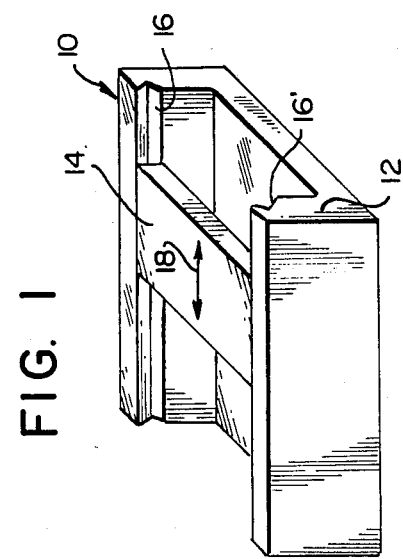
FIG. 1 is a perspective view of a generalized positioning table to which reference will be made in explaining the present invention.

Referring now to FIG. 1, a generalized single-axis positioning table is shown at 10. A frame 12 supports a table 14 which is enabled by appropriate guides such as grooves 16 and 16' to move to selected longitudinal positions as indicated by a double-headed arrow 18.

Conventionally, table 14 is moved to selected positions by the rotation of a lead screw (not shown) affixed to frame 12 driving a preloaded circulating ball nut (not shown) affixed to table 14.

Figure 2:
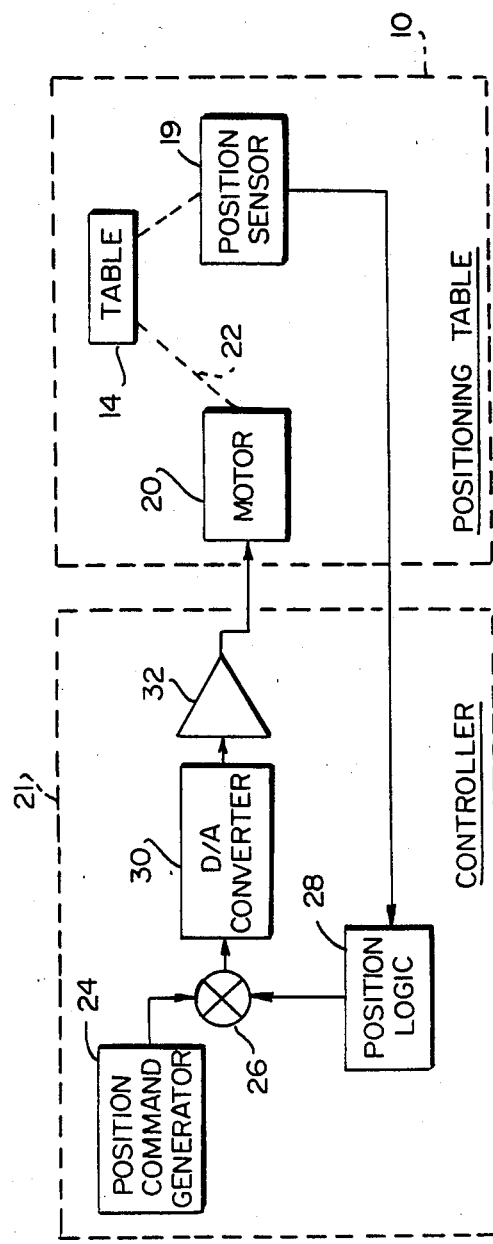
FIG. 2 is a simplified block diagram of electrical control of a positioning table.

Referring now to FIG. 2, a position sensor 19 determines the position of table 14. The sensed position of table 14 is then employed in a controller 21 to produce a control signal for a motor 20 which applies a mechanical force represented by a dashed line 22 tending to move table 14 to a desired position.

The desired or commanded position is selected by a position command generator 24 which may be represented by a manual input or by a value stored in a computer. The desired position is applied to a plus input of a subtractor 26. A position logic circuit 28 processes the position signal from position sensor 19 and applies the result to a minus input of subtractor 26.

In the preferred embodiment, the two signals applied to subtractor 26 are digital signals and the output of subtractor 26 is also a digital signal which is applied to the input of a digital-to-analog converter 30. Digital-to-analog converter 30 produces an analog output signal related to its digital input signal and applies this output to an amplifier 32 which, in turn, produces the control signal for motor 20.

As used in FIG. 2, motor 20 is a generalized concept producing mechanical force 22. In order to provide the background necessary for understanding the linear motor of the present invention, a simplified conventional rotating DC motor is shown at 34 in FIG. 3. A coil of wire 36 is wound around a soft iron core 38, shown as a cylinder. Electric power is fed from a battery 40 through brushes 42 and 44 and slip rings 46 and 48 to coil of wire 36. Coil of wire 36, core 38 and slip rings 46 and 48 are arranged to rotate about an axis 50.

A first permanent magnet 52 is arranged with north pole N adjacent to coil 36 and core 38. A second permanent magnet 54 is disposed with its south pole S facing the opposite side of coil 36 and core 38.

With the instantaneous electrical and mechanical arrangement shown, core 38 is magnetized with the magnetic polarities as shown. This tends to rotate the rotating elements in the clockwise direction to move the north and south poles of core 38 into alignment with the south and north poles respectively of permanent magnets 54 and 52. Just as such alignment is obtained, gaps 56 and 58 between slip rings 46 and 48 pass under brushes 42 and 44 whereby the direction of current in coil 36 is reversed thereby reversing magnetic polarities on core 38. Thus, the rotating elements are urged to continue in rotation.

It would be clear to one skilled in the art that reversing the polarity of voltage applied to brushes 42 and 44 would reverse the direction of rotation of the rotating portions of DC motor 34.

Figure 3:
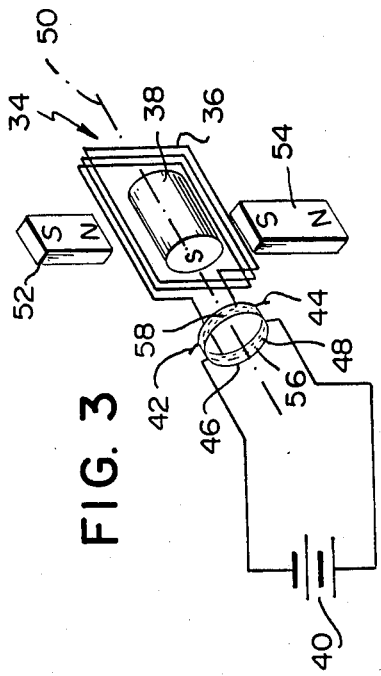
FIG. 3 is a simplified drawing of a DC motor adapted for rotation.

The simplified DC motor of FIG. 3 can be developed, or flattened out to produce a linear force rather than a rotational torque. Coils corresponding to coil 36 of FIG. 3 can be made to move past a plurality of permanent magnets corresponding to permanent magnets 52 or 54 of FIG. 3 in the manner shown in FIG. 4, or, alternatively, one or more permanent magnets may be made to move linearly past a plurality of coils as shown in FIG. 5.

Figure 4:
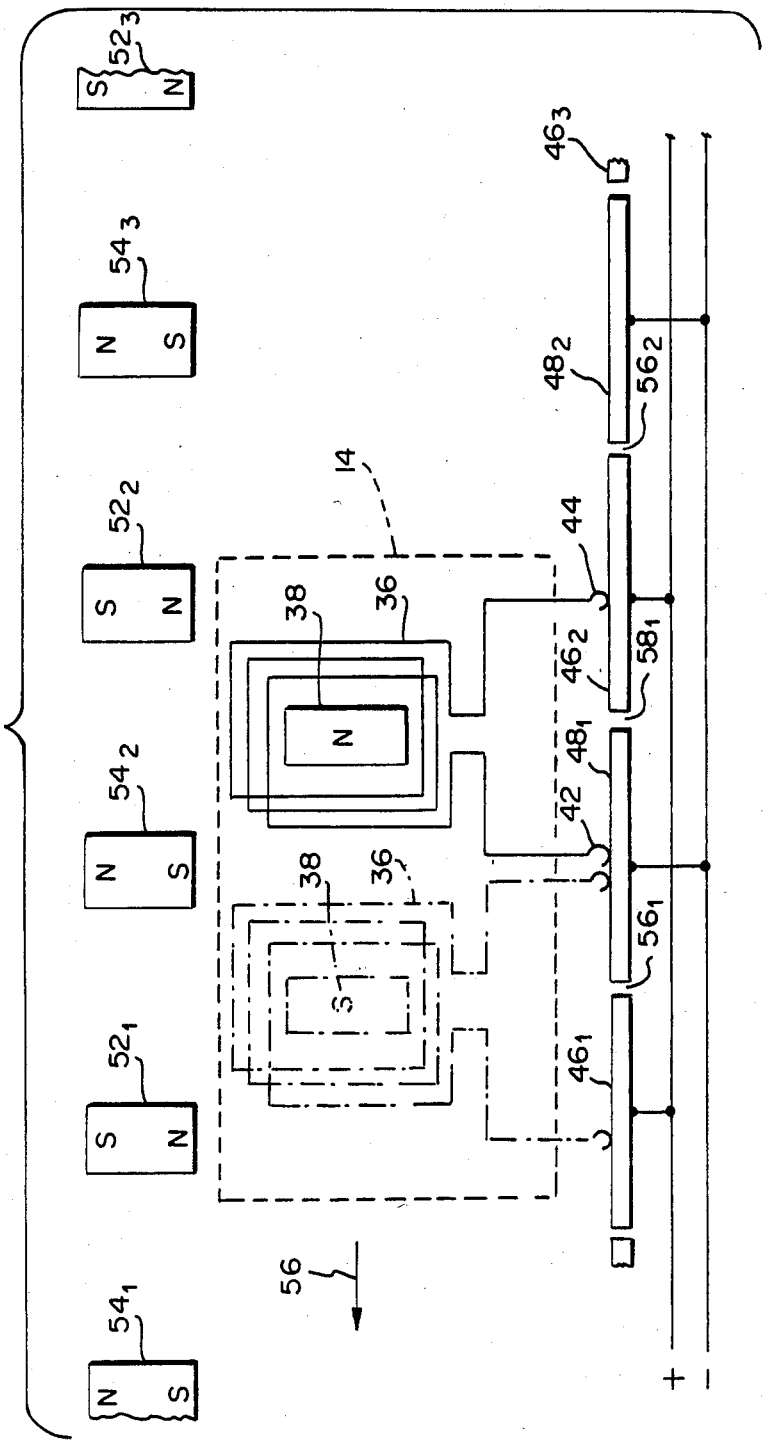
FIG. 4 is a simplified drawing of a linear motor of the type in which at least one coil and core are attached to move with the table and a plurality of magnets is affixed to the frame.
Figure 5:
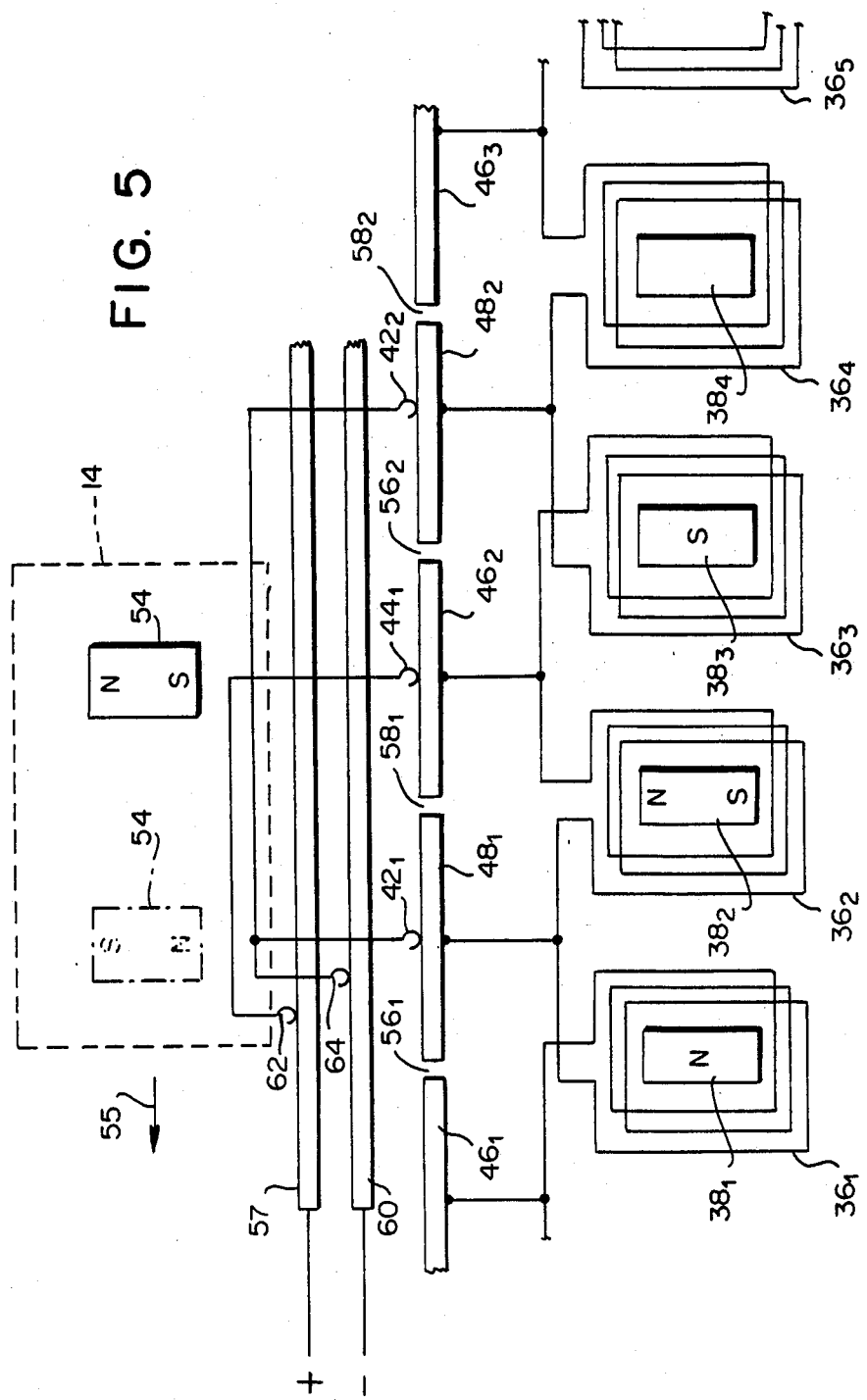
FIG. 5 is a schematic diagram of a linear motor in which at least one permanent magnet is fixed to move with the table and an array of a plurality of cores and coils is mounted in the frame.

In the embodiment of FIG. 4, coil 36 and a core 38 (not necessarily a cylindrical core as in the simplified illustration) are affixed to, and move with, table 14. A plurality of appropriately spaced and polarized permanent magnets $52_1$–$52_3$ and $54_1$–$54_3$ are disposed on frame 12 (FIG. 1). In addition, slip rings $46_1$–$46_3$ and $48_1$–$48_3$ have been developed or flattened and affixed to frame 12 in a position where they may be contacted by brushes 42 and 44 which move with table 14.

In the position of coil 36 and core 38 shown in full line, the north magnetic pole of core 38 is repelled by the north pole of permanent magnet $52_2$ and is attracted by the south magnetic pole of permanent magnet $54_2$. This tends to move table 14 in the leftward direction in FIG. 4 as indicated by an arrow 55. As brushes 42 and 44 pass gaps $58_1$ and $56_2$, respectively, the polarity of voltage to coil 36 and of the consequent magnetic polarity of core 38 are reversed just as core 38 approaches alignment with permanent magnet $54_2$. This tends to continue to urge table 14 leftward as indicated by a subsequent position of coil 36 and core 38 shown in dash-dot line.

It would be clear to one skilled in the art that the linear force imparted to table 14 could be increased by including a plurality of coils 36 and cores 38 on table 14 appropriately longitudinally spaced with respect to the pitch or intermagnet spacing of the permanent magnets. Furthermore, brushes for such additional coils would be also appropriately spaced to contact suitable ones of linear slip rings $46_1$–$46_4$ and $48_1$–$48_3$. The distance which table 14 can travel is limited only by the extent of the plurality of magnets and the slip rings.

Referring now to FIG. 5, a single permanent magnet 54 is shown in full line affixed to move with table 14 past a plurality of coils $36_1$–$36_5$ each enclosing a core $38_1$–$38_5$. A pair a brush of brushes $42_1$–$44_1$ and $42_2$ are affixed to move with table 14 and contact appropriate ones of developed slip rings $46_1$–$46_4$ and $48_2$–$48_5$. A pair of power pickup rails 57 and 60 are contacted respectively by power pickup brushes 62 and 64 which are also affixed to move with table 14. Thus, at every position of table 14, power pickup brush 62 delivers power from power pickup rail 57 to brushes $44_1$ and $44_2$ whereas power pickup brush 64 delivers power from power pickup rail 60 to brushes $42_1$ and $42_2$. It should be noted that brushes $42_1$–$42_2$ and $44_1$–$44_2$ are arranged so that adjacent coils $36_2$ and $36_3$ are oppositely polarized so that adjacent cores $38_2$ and $38_3$ have opposite magnetic poles facing permanent magnet 54. As table 14 moves in the direction of motion indicated by arrow 55, appropriate reversal of current in the coils maintains a tendency for linear motion. That is, when brushes $42_1$–$44_1$ and $42_2$–$44_2$ pass gaps $56_1$–$58_1$ and $56_2$–$58_2$, the current flows through coil $36_2$ in the opposite sense and reverses the polarity of core $38_2$ in order to change the magnetic polarity of core $38_2$ from north N shown in solid line to south S. Coil $36_3$ is deenergized at this time. Coil $36_1$ is energized by brushes $42_1$ and $44_1$ to produce a north magnetic polarity N as indicated by a dashed N in core $38_1$. Thus, continued motion of table 14 is achieved.

Power pickup rails 57 and 60 and power pickup brushes 62 and 64 could, of course, be replaced by flexible cables. However, this would add extra parts to the apparatus as well as provide elements prone to failure. As will be clear in a practical embodiment described hereinafter, power pickup rails 57 and 60 and power pickup brushes 62 and 64 are simply and economically achieved.

Figure 6:
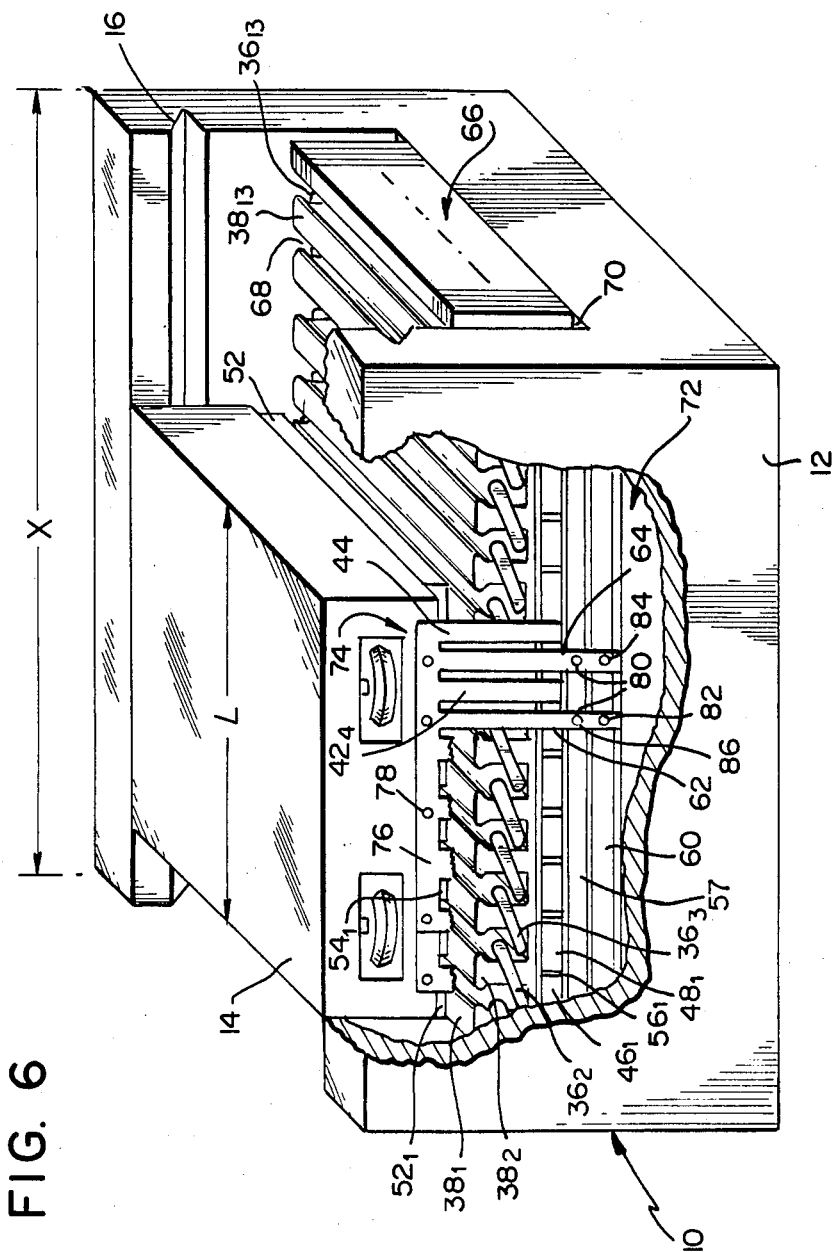
FIG. 6 is a perspective view partially cut away to reveal internal components of a practical embodiment of the linear motor of FIG. 5.

Referring now to FIG. 6, a practical embodiment of positioning table 10 corresponding to the simplified embodiment of FIG. 5 is shown.

A toothed assembly, shown generally at 66, is disposed in frame 12 with parallel linear teeth thereof forming cores $38_1$–$38_{13}$ and having slots 68 between adjacent teeth. Toothed assembly 66 is preferably assembled from a plurality of laminations 70 of soft iron to reduce eddy current losses. Coils $36_1$–$36_{13}$ are each wound about one tooth of toothed assembly 66, each tooth of which thereupon assumes a magnetic polarity produced according to the direction of current in the respective coil.

A power pickup rail and slip ring assembly, shown generally at 72, may be a single unitary assembly preferably made by etching a circuit board to produce longitudinal conductive strips serving as power pickup rails 57 and 60 as well as a longitudinal set of slip ring strips $46_1$, etc. and $48_1$, etc. separated by nonconductive areas of circuit board substrate. Thus, power pickup rail and slip ring assembly 72 is formed of a planar board having conductive areas on its surface.

A brush and power pickup brush assembly, shown generally at 74, includes a top rail 76 affixed to table 14 by any convenient means such as, for example, by a plurality of screws 78. Two sets of brush fingers $42_1$–$42_4$ and $44_1$–$44_4$ depend from top rail 76 for contact with developed slip rings $46_1$, etc. and $48_1$, etc. Power pickup brush fingers 62 and 64 also depend from top rail 76 and appropriately contact power pickup rails 57 and 60.

It should be noted that power pickup brush fingers 62 and 64 have identical lengths and overlap both power pickup rails 57 and 60. Each power pickup brush finger includes a upper punched hole 80 centered over power pickup rail 57 and a lower punched hole 82 centered over power pickup rail 60. A brush contact 84 located in lower hole 82 of power pickup brush finger 64, contacts power pickup rail 60 and displaces the remainder of power pickup brush finger 64 outward sufficiently to avoid contact with power pickup rail 57 or any of the slip rings $46_1$, etc. and $48_1$, etc. In an analogous manner, a brush contact 86, installed in upper hole 80 of power pickup brush finger 62, establishes contact with power pickup rail 57 and prevents contact of the remainder of power pickup finger 62 with other metallic elements.

It would be clear to one skilled in the art that brush and power pickup brush assembly 74 should be insulated from table 14 and that the two power polarities therein must be insulated from each other.

An array of parallel permanent magnets 52, etc. and 54, etc. having alternative polarities are affixed to the underside of table 14 facing toothed assembly 66. Permanent magnets $52_1$, etc. and $54_1$, etc. are preferably bar-shaped ceramic-type magnets placed parallel to each other normal to or slightly inclined to the normal to the axis of motion of table 14 with their broad faces forming a plane facing toothed assembly 66. The poles of permanent magnets 52, etc. and 54, etc. are normal to their broad faces. That is, for example, the entire face of permanent magnet $52_1$ facing toothed assembly 66 is a north pole, and the entire face of permanent magnet $54_1$ facing toothed assembly 66 is a south pole. In the preferred embodiment, table 14 is of magnetically permeable material which serves to complete the magnetic path between adjacent permanent magnets 52, etc. and 54, etc. and therefore reduces external effects which leakage magnetic fields may produce.

Figure 7:
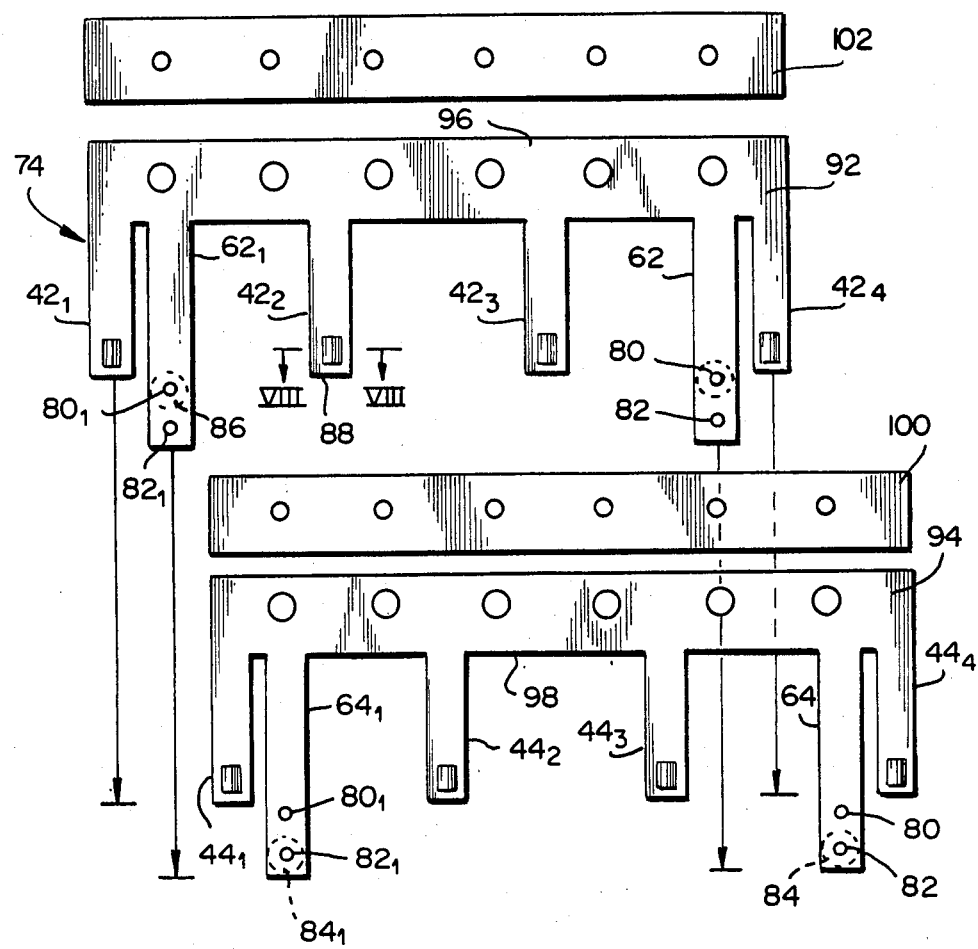
FIG. 7 is an exploded view of a brush and power pickup brush assembly of FIG. 6.

Referring now to FIG. 7, brush and power pickup brush assembly 74 is shown disassembled to aid in the description thereof. Brush and power pickup brush assembly 74 is seen to include two comb-like members 92 and 94 of metal and preferably of a spring-like metal such as, for example, of beryllium bronze.

Figure 8:
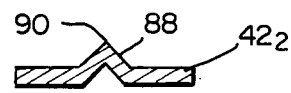
FIG. 8 is a cross section taken along VIII—VIII of FIG. 7.

Each of brush fingers $42_1$, etc. and $44_1$, etc. includes a triangular-shaped dimple 88 therein also shown in FIG. 8. The convex portion of dimple 88 faces power pickup rail and slip ring assembly 72 to produce a line contact at the apices 90 thereof.

It should be noted that besides power pickup brushes 62 and 64 at the right ends of assembly 74, corresponding redundant power pickup brush fingers 62' and 64' are provided at the left ends thereof. This provides additional power carrying capacity as well as tending to mechanically balance the spring forces acting on assembly 74.

Comb-like member 92 includes a top rail 96 from which brush fingers 42, etc. and power pickup brush fingers 62 and 62' depend. Comb-like member 94 includes a top rail 98 from which brush fingers $44_1$, etc. and power pickup brush fingers 64 and 64' depend.

An insulating strip 100 is disposed between top rails 96 and 98 to insulate comb-like members 92 and 94 from each other. A similar insulating strip 102 is assembled between top rail 96 and table 14 to thus insulate comb-like member 92 from table 14.

It should be noted that the identical nature of comb-like members 92 and 94, except for the placement of brush contacts 84 and 86, permits a single stamping die to be used to form all of the metallic parts of brush and power pickup brush assembly 74. This significantly reduces the tooling and other manufacturing costs of assembly 74. Further, insulating strips 100 and 102 are identical, differing only in their placement with respect to the remaining parts of assembly 74. This also reduces tooling and manufacturing costs.

In view of the foregoing disclosure, it would be clear to one skilled in the art that a practical embodiment of the apparatus shown in simplified form in FIG. 4 could also be accomplished by forming a toothed assembly (not shown) on the bottom of table 14 with coils (not shown) appropriately wound around the teeth and with an assembly of magnets (not shown) on frame 12. From the description of FIG. 4, it would be clear that the power pickup brush fingers 62, 62', 64 and 64' could be omitted. It would also be clear that brush fingers $42_1$, etc. and $44_1$, etc. would have to be appropriately electrically separated in order to permit connection of adjacent coils in a manner similar to the connection of adjacent coils in FIG. 5. Since the electrical and mechanical arrangement of such a brush system would be well within the ability of one skilled in the art given the foregoing disclosure, a detailed description of a brush assembly to accomplish the arrangement of FIG. 4 is omitted.

It would also be clear that conventional brush contacts (not shown) may be employed on brush fingers 42, etc. and 44, etc, in place of the triangular-shaped dimples 88 without departing from the scope and spirit of the invention.

Figure 9:
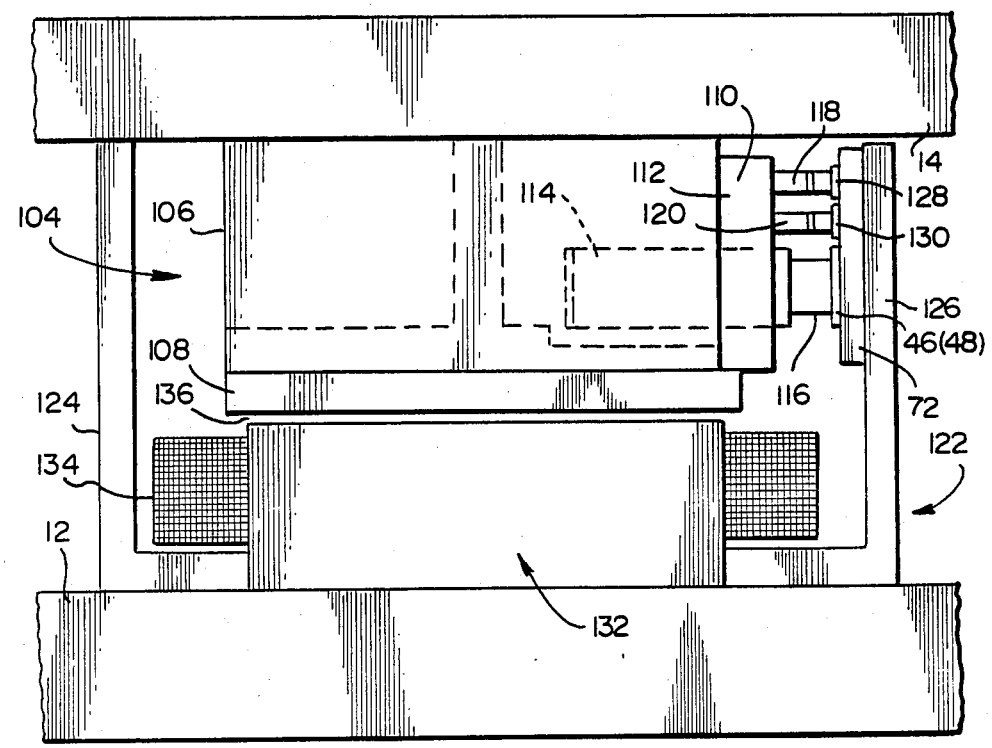
FIG. 9 is an end view of a portion of a positioning table showing a further embodiment of a brush and pickup assembly.

Referring now to FIG. 9, a most preferred embodiment of the invention capable of higher power and improved service life is shown. An integrated magnet and brush assembly, shown generally at 104, is affixed to the underside of table 14 for concerted movement therewith. A holder 106 which, in the preferred embodiment, is machined from a block of metal, has magnets 108 affixed to the bottom thereof and a brush assembly 110 affixed to the side thereof.

Brush assembly 110 includes a insulating strip 112 having a plurality of brush holders 114 longitudinally spaced apart therein with spring-loaded brushes 116 of conventional brush material urged outwardly therefrom. Power pickup brushes 118 and 120 are also affixed to insulating strip 112 separated from brush holders 114 and from each other.

A coil and slip ring assembly 122 includes a U-shaped metallic frame 124 disposed parallel to the direction of travel of table 14 with the arms of the U extending upward close to, but not touching, the underside of table 14. A power pickup rail and slip ring assembly 72 is affixed to the inside of upright arm 126 of U-shaped metallic frame 124 facing brushes 116 and power pickup brushes 118 and 120. Power pickup rail and slip ring assembly 72 is identical to the element previously described with commutator or slip ring elements 46 and 48 contacted by brushes 116 and power pickup rails 128 and 130 contacted respectively by power pickup brushes 118 and 120. A toothed assembly 132, is disposed in the base of the U-shaped metallic frame 124 with coils 134 wound therein similar to that previously described. A relatively small air gap 136 is provided between magnets 108 and the upper surfaces of the teeth in toothed assembly 132.

Figure 10:
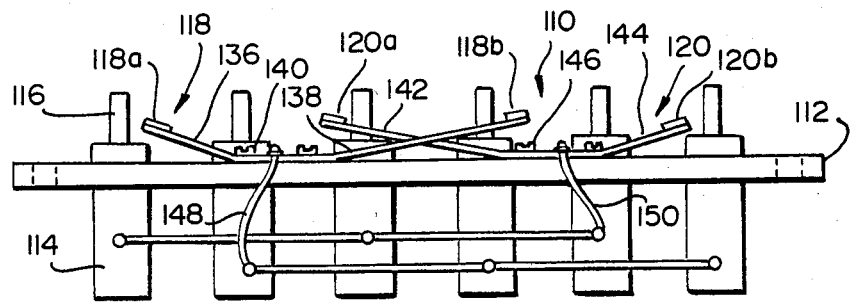
FIG. 10 is a side view of a brush assembly of FIG. 9.

Referring now to FIG. 10, brush assembly 110 is shown from the top isolated from the remainder of the apparatus. It will be noted that brush material 116 protrudes forward beyond its normal operating position by the action of resilient urging means within brush holders 114. In addition, power pickup brush 118 is seen to include first and second power pickup brushes 118a and 118b at ends of arms 136 and 138 respectively. Power pickup brushes 118a and 118b are electrically connected by arms 136 and 138. Arms 136 and 138 are mounted on insulating strip 112 by any convenient means such as by screws 140. Similarly, power pickup brush 120 is seen to consist of a pair of power pickup brushes 120a and 120b at the ends of arms 142 and 144 respectively which are secured in place by any convenient means such as by screws 146.

An interconnecting wire 148 is electrically connected to arms 136 and 138 and also to the second, fourth and sixth brush holders from the left in FIG. 10. Similarly, an interconnecting wire 150 is connected to arms 142 and 144 as well as to the first, third and fifth brush holders from the left. Thus, alternate brush holders receive the outputs from power pickup brushes 118a 118b and 120a, 120b.

The apparatus in FIGS. 10 and 11 function identically to that shown and described in connection with the preceding embodiments and, therefore, the operation thereof will not be further described.

Having described a specific preferred embodiment of the invention with reference to the accompanying drawings, it is to be understood that the invention is not limited to those precise embodiments, and that various changes and modifications may be effected therein by one skilled in the art without departing from the scope or spirit of the invention as defined in the appended claims.

I claim:

1. A DC linear motor comprising: a metallic frame;
   a stationary magnetic member affixed to said metallic frame;
   said stationary magnetic member including a plurality of windings;
   said plurality of windings being spaced apart along a longitudinal axis;
   a movable member;
   a surface on said movable member facing said plurality of windings;
   a plurality of permanent magnets on said surface spaced from said stationary magnetic member;
   a planar power pickup rail and slip ring assembly disposed parallel to said longitudinal axis;
   said assembly including a plurality of conductive areas on its surface;
   each of said conductive areas being permanently electrically connected to at least one winding of said plurality of windings;
   at least first and second brushes affixed to said movable member;
   means for resiliently urging said at least first and second brushes into sliding electrical contact with said assembly;
   said plurality of conductive areas and said first and second brushes being spaced along said longitudinal axis to provide an electrical connection from said first brush through one of said conductive areas to a first end of one of said plurality of windings, through said one of said plurality of windings to a second end thereof, and through a second of said conductive areas to said second brush whereby a complete electrical circuit through said one of said plurality of windings is attainable;
   at least first and second conductive power pickup rails on said assembly, said first and second conductive power pickup rails being disposed in the same plane as said conductive areas and parallel to said longitudinal axis;
   at least third and fourth brushes on said movable member;
   means for resiliently urging said at least third and fourth brushes into contact with said at least first and second conductive power pickup rails respectively;
   a first interconnection between said third brush and said first brush; and
   a second interconnection between said fourth brush and said second brush.

2. A DC linear motor according to claim 1 wherein said assembly is an etched circuit board, said plurality of conductive areas and said at least first and second conductive power pickup rails being of metallic material affixed to an insulating board.

3. A DC linear motor according to claim 1 wherein said metallic frame includes a U-shaped metallic frame having a base and first and second arms, said stationary magnetic member being affixed to said base inside said U-shaped metallic frame, said assembly being affixed to an inside of one of said first and second arms with said plurality of conductive areas and said first and second conductive power pickup rails facing the other of said first and second arms.

* * * * *